Figure 1:
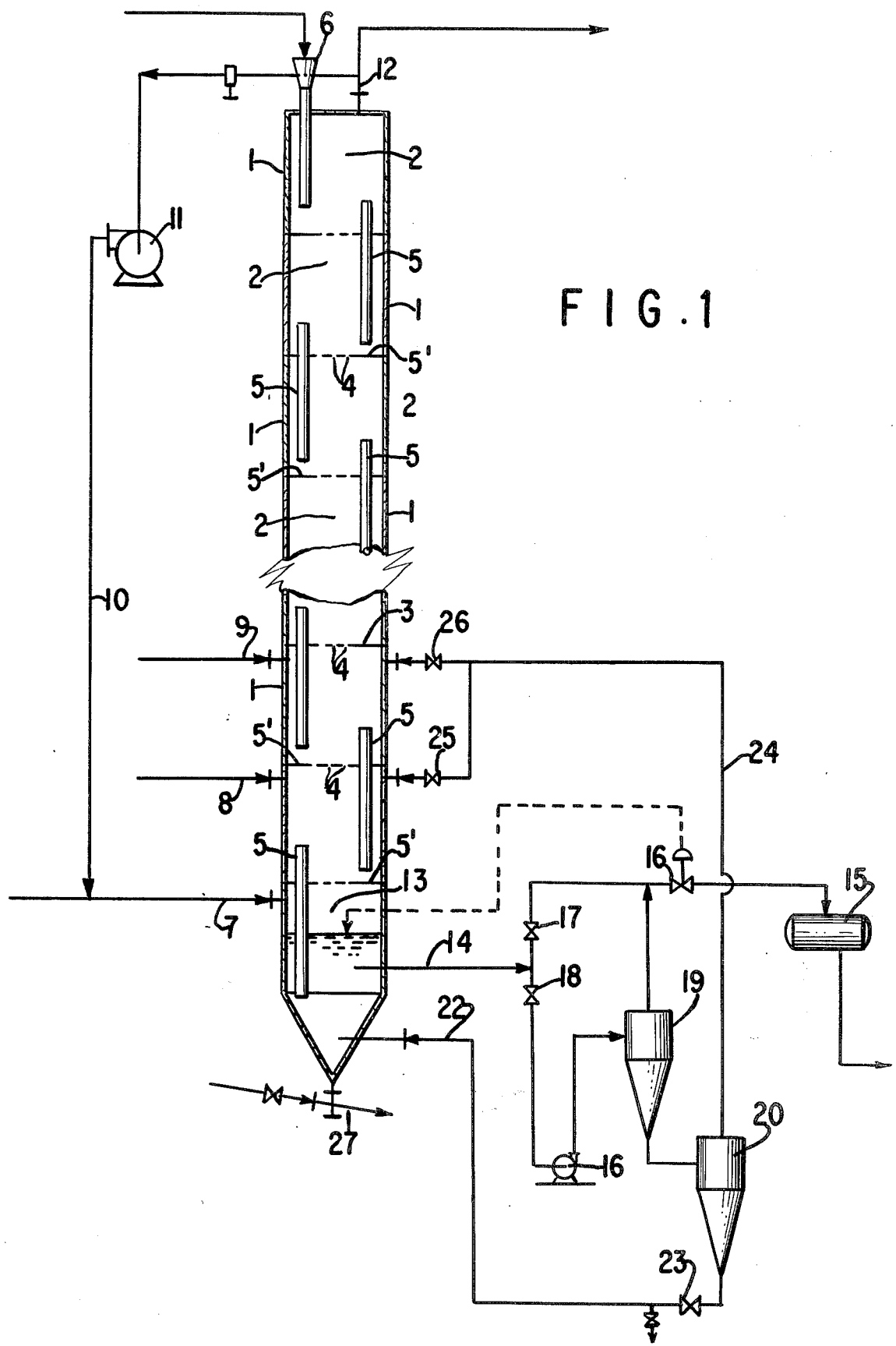

United States Patent [19]

Pénard et al.

[11] 4,017,592
[45] Apr. 12, 1977

[54] PROCESS FOR PRODUCTION OF AQUEOUS HYPOCHLOROUS ACID SOLUTION

[75] Inventors: Herbert F. L. Pénard, Bussum; Johannis I. Risseeuw, Maarssen, both of Netherlands

[73] Assignee: Comprimo N.V., Amsterdam, Netherlands

[22] Filed: May 11, 1972

[21] Appl. No.: 252,453

[30] Foreign Application Priority Data

May 12, 1971 Netherlands ............... 7106494

[52] U.S. Cl. .................... 423/473; 423/437; 423/497; 423/659
[51] Int. Cl.² ................................ C01B 11/04
[58] Field of Search .......... 423/473, 472, 497, 437, 423/659 R, 659 F, 481, 519

[56] References Cited

UNITED STATES PATENTS

| | | | |
|---|---|---|---|
| 2,042,477 | 6/1936 | Miller et al. | 423/519 |
| 2,665,972 | 1/1954 | Lewis et al. | 423/437 |
| 2,762,692 | 9/1956 | Spitz et al. | 23/283 |
| 3,428,420 | 2/1969 | Douglas et al. | 423/519 |
| 3,709,978 | 1/1973 | Predikant | 423/481 |

FOREIGN PATENTS OR APPLICATIONS

| | | | |
|---|---|---|---|
| 525,585 | 5/1956 | Canada | 423/659 F |
| 1,019,646 | 11/1957 | Germany | 423/659 F |
| 700,039 | 11/1953 | United Kingdom | 423/659 F |

OTHER PUBLICATIONS

"Encyclopedia of Chemical Reactions" book by C. A. Jacobson, vol. 2, 1948, pp. 679 and 680, Reinhold Publishing Corp., New York.
Chemical Engineering, Dec. 1947, pp. 112–115.

*Primary Examiner*—Edward Stern
*Attorney, Agent, or Firm*—Albert C. Johnston

[57] ABSTRACT

Reactions in heterogeneous systems containing reactants in gaseous, liquid and solid phases are carried out in a tower composed of a series of superimposed reaction compartments mutually separated by horizontal shelves, through which the gaseous phase moves countercurrent to the liquid and solid phases and at the same time effects turbulent mixing with the liquid phase. The liquid and solid phases are introduced into the top compartment. The shelves are suitably perforated for upflow of the gas through bodies of mixed liquid and solids which are held on the shelves at levels determined by the heights of overflow pipes which conduct excess reaction mixture from each reaction compartment into the mixture in the compartment next below. Reaction products are taken off from the bottom compartment.

5 Claims, 2 Drawing Figures

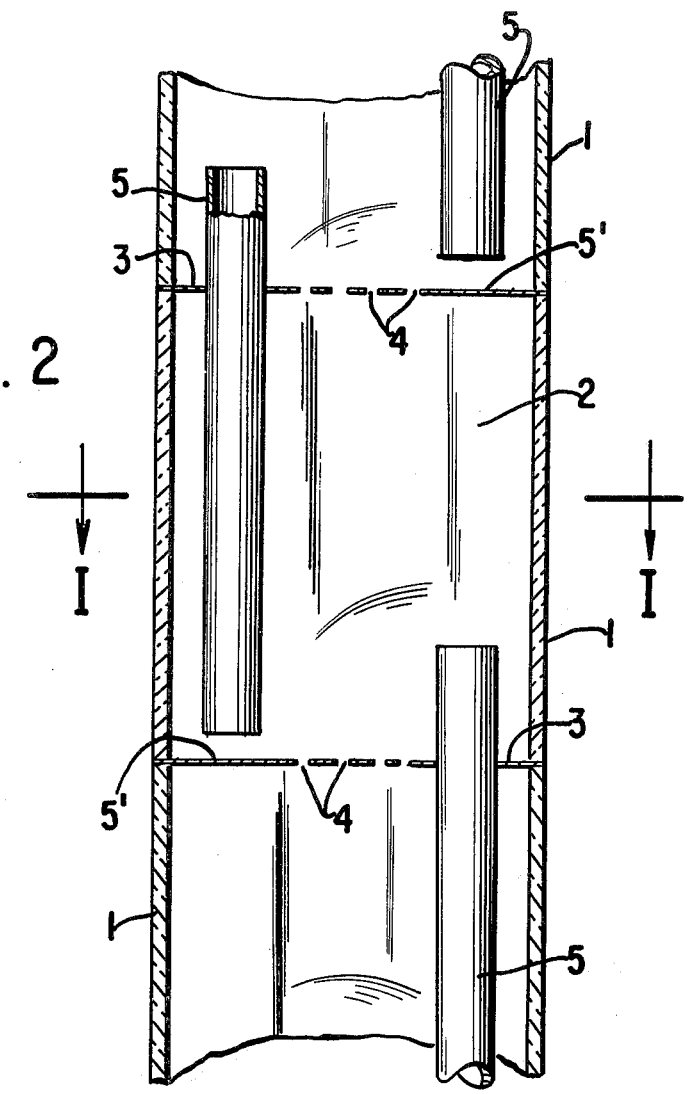
FIG.2
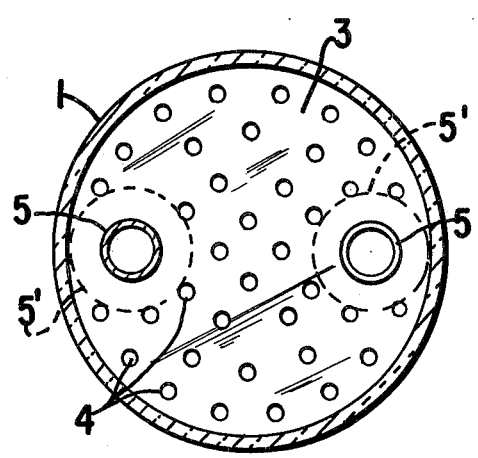
I—I

PROCESS FOR PRODUCTION OF AQUEOUS HYPOCHLOROUS ACID SOLUTION

Components of different phases in heterogeneous systems containing a gas, liquid and one or more solid phases, hereinafter called G-L-S - systems, react in many cases rather slowly which in many cases is mainly caused by a too small contacting surface between the reactants and a too slow mass transfer rate between the phases. Reaction rate can be so slow that it is technically unacceptable.

A rather large number of methods and devices are known which may be useful to overcome these problems. One may intensively mix the phases or disperse one phase in the other, forming emulsions or suspensions which may contain very small to rather large and coarse particles. Such mixing or dispersing may be effected with the use of mechanical means such as stirrers, turbines, sprayers, rotating disks and rotating screens. Many solids, however, are difficult to reduce to the required particle size and shape, and form sediments and deposits in the reactor equipment. These deposits tend to clog the lines and to damage the moving parts of the installation. With a too low reaction rate it is normal practice to provide a number of reaction stages connected in series. In such systems, such as a cascade system, the phases preferably move in countercurrent direction with respect to each other.

The known methods and apparatus do not always provide a technically acceptable solution and moreover in the existing systems there still is a need for more efficient and less expensive methods and equipment to cut down maintenance and increase capacity. This is also and especially true in those cases and with such reactions wherein the reaction components act strongly corroding on the material of the equipment and/or where the solid phase or phases exert an abrasive or scouring action on part of the apparatus. Evidently the problems grow as more influences act simultaneously. In such case rotating parts, packing glands and material corrode to such extent and with such speed that the operations have to be repeatedly interrupted for maintenance work. The problems grow as the number of steps to carry out the reaction grow. Final consequences are reduced capacity, reduced life of the installation and high production cost.

The invention comprises a method and apparatus for carrying out reactions in G-L-S-systems containing a gas, at least one liquid and at least one solid phase.

It is an object of the invention to provide an improved method and apparatus for carrying out reactions in G-L-S-systems without the use of moving parts in the reactor.

It is a further object of the invention to carry out reactions in G-L-S-systems which contain aggressive and/or abrasive components. Another object of the invention is to reduce maintenance cost of total reaction equipment.

A still further object of the invention is to provide reaction equipment in which the gas phase moves countercurrent to the other phases and at the same time effects turbulent mixing with the liquid phase. Further objects of the invention will be clear from the following description and the claims.

The apparatus used according to the invention is characterized by a number of reaction compartments, one above the other and connected in series, said reaction compartments being mutually separated by substantially horizontal shelves, or intermediate bottoms, said separating means being provided with openings or nozzles or similar devices for distributing the gas in the L-S-phase, and said compartments being provided with overflow pipes or similar devices acting as connecting means for the L- or L-S-phase between adjacent compartments.

According to the method of the invention the gas is introduced below the lowest separating shelf, whereas the L-S-mixture, -dispersion, -sludge, or -paste, in this discription together indicated as L-S-suspension, is introduced into the upper part of the reactor, normally above the highest separating shelf. The reaction product is removed from the lowest reaction compartment and the gas phase, consisting of unreacted gas component, and possibly inert gas, or gas formed by the reaction, leaves the reactor at the top portion. The whole reactor is shaped as a vertical tower and makes it possible to carry out reactions in a G-L-S-system continuously and countercurrently. By proper material selection such reactor makes it possible to effect reactions between a gas and a liquid or solid in a heterogeneous G-L-S-system also in such cases in which reaction components or reaction products occur that have a chemically aggressive and/or abrasive or corrosive action.

The gas phase may contain components which are inert as such or toward the components of the other phases, such as nitrogen, air or carbon dioxide. The inert gas may be important and even sometimes needed for mixing and homogenizing of the phases and for efficient heat control. One may also introduce the gas, containing the reactive component, above the lowest separating bottom and the inert gas or part of the off-gas under said bottom. In the last way one may reduce the concentration of unreacted component in the off-gas.

An apparatus for carrying out the invention is illustrated schematically in the annexed drawings, in which FIGS. 1 and 2 are diagrammatic elevational views, partly in section, of the whole and a portion, respectively, of a reaction column, or tower, and FIG. 3 is a transverse cross-sectional view taken on line I—I of FIG. 2.

As appears from FIG. 1 the reactor is constructed as a vertical tower, divided into a number of compartments 2 arranged in series, one above the other and mutually separated by the shelves or bottoms 3 which are provided with the means 4 for distributing the gas in the suspension. The means 4 may be perforations or openings of appropriate dimensions. In each separating bottom an outlet, preferably an overflow pipe 5 is arranged forming a line for connecting the liquid phase with the next lower reaction compartment. The bottoms 3 are positioned in such a way that the overflows in adjacent chambers are not aligned with each other, and preferably they are situated at opposite sides of the column. The openings 4 for distributing the gas are essentially divided evenly over the bottom surface as illustrated in FIG. 2, except, however, the plane limited by the vertical projection of the cross-section of the overflow pipe above said bottom. Within said plane and preferably a somewhat larger portion of said plane obtained by increasing the diameter of the projection of the overflowpipe by 2 to 4 times the distance between the overflow pipe and the relevent lower bottom no openings are provided, in order to prevent the gas from finding its way through the downcomer pipes of the liquid.

The height of the suspension in the reaction compartment is determined by the height of the overflow above the separating bottom. The lower portion of the overflow extends into the suspension of the next lower reaction compartment.

The suspension is continuously introduced into the highest reaction chamber through the funnel 6, the tube of which dips into the liquid surface of the upper reactionchamber. The reaction gas is supplied below the lowest bottom through the inlet 7. If desired one may also supply a carrier gas or an inert gas or part of the off-gas through said inlet. Part of the off-gas goes through conduit 10, being moved by a ventilator or similar device 11. One may also introduce the reaction gas through an inlet at 8 or 9 in a higher positioned reaction space. In this case the liquid level in these reaction compartments is maintained by the introduction of inert gas or recirculating off-gas under the separating shelves of the reaction compartments above the inlet 7 and/or 8

The gas formed in the reaction possibly with the inert gas is removed through line 12 to the atmosphere or eventually to a device for further processing.

From the space below the lowest separating bottom the reaction product is moved through line 14 for further processing or into the collecting vessel 15. In space 13 the liquid level is controlled and kept constant by a level controller connected with adjusting valve 16.

If it is desired to reintroduce the non-reacted part of the solid this can be done for instance with the use of the hydrocyclone system 20, as indicated in FIG. 1. In line 14 the valve 17 is closed and valve 18 opened, whereupon the liquid reaction product is pumped through pump 16 into the hydrocyclones 19 and 20, in which the suspension is concentrated. Coarser particles or non-reactive substances, such as sand, silicates, etc. leave the conical part of the second cyclone 20 through line 22 having valve 23 and come into the conical bottom of compartment 13, from which they are removed from time to time by the sludge catcher 27. Reactive particles of the solid phase are brought into a higher reaction chamber from the second cyclone 20 through line 24 having branches controlled by valves 25 and 26. The liquid product is fed from the first cyclone 19 through valve 16 into the collecting vessel 15 or transferred for further processing.

The apparatus can also be used with advantage in cases where heat is developed or has to supplied. In such case one may arrange in appropriate locations of the reaction column cooling- and/or heating coils, in which circulates a cooling or heating fluid, of which the temperature and circulation speed can be controlled, manually or automatically.

An example of the practice of the invention is for the hydrogenation of vegatable or mineral oils with a solid catalyst, such as supported nickel. These reactions may also be carried out under pressure and the hydrogen possibly mixed with an inert gas may be recirculated into the reaction space.

The larger opening at 5 in each plate 3 as shown in FIG. 2 serves to let pass the overflow pipe. The small perforations for gas distribution have to be distributed evenly over the plate surface. The plate portion directly under the downcoming tube 5 of the next higher plate should be free of openings and it has been found preferable even to increase this portion by enlarging the vertical projection of the downcomer by two to four times the distance between the lower edge of the downcomer and the plate beneath it, measured along the diameter of the projection. Penetration of the gas through the overflow is thereby minimized. The said distance between downcomer and plate should normally be one sixth to one fourth of the internal diameter of the overflowpipe.

According to the method of the invention the linear speed of the gas in the openings of the separating shelf should be between 0.3 and 6 m per second (12 to 240 inches per second). It is preferred to use a linear speed of 2 to 3½ m/second (80 to 140 inches/sec.) with a total free cross section of the openings amounting to 1 to 3½% of the total surface of the separating shelf. The number of openings and the total cross section are determined according to the total gas volume passing the cross section of the column per second. The method including its size and speed limitations does not require that all of the suspension or of its liquid portion be transferred through the overlfow to a lower level, but includes letting part of it drop down directly through the openings. With appropriate size of the openings and lower gas rates one thus can even prevent sedimentation of the suspension or formation of crystals in the openings, which would clog them. Generally the depth of the layer of the suspension above each bottom plate should be 10 to 40 times the distance from the lower edge of the overflow to the next bottom plate. With deeper layers the mixing effect of the gas stream is reduced, especially in the upper portion of the layer and smaller bubbles unite to larger ones thereby losing their kinetic energy.

If in the reaction system a reaction takes place between the gas and a suspension of particles of different sizes, it is possible that the larger particles have not sufficient time to react completely, so that they leave in unreacted condition together with the end product of the column. In this case it is possible to circulate part of the product into a higher reaction compartment either directly or after concentrating the suspension, which may be done in a known way, for instance in a hydrocyclone, a coalescer or a sedimentation vessel.

The method and apparatus according to the invention have many advantages for the preparation of aqueous solutions of hypochlorous acid according to the following equation:

$$CaCO_3 + 2 Cl_2 + H_2O \rightarrow 2 HOCL + CaCl_2 + CO_2 \qquad (1)$$

The produced solution is important as an intermediate, for instance for the production of chlorohydrins such as glycerol chlorohydrins. Aqueous solutions of HOCl are not stable and decompose faster as the strength of the solution increases. It is known that 1 to 2% solutions rapidly lose their chemical activity.

According to the method of the invention 2 to 3 wt%-solutions and even 3.5% solutions can be prepared continuously with a satisfying yield. This is possible as a result of a good contact between the phases, connection of the reaction chambers in series and carrying out the reaction according to the countercurrent principle. The reaction between gaseous chlorine and the limestone suspension in water takes place very smoothly at a temperature of 10° to 30° C. The period of time the reaction mixture remains in each of the reaction compartments amounts preferably to 0.5 to 2 minutes. Chlorine is fed from below and a limestone suspension from above. The suspension advantageously contains, per kilogram thereof, 15 to 35 grams of limestone particles which predominantly have a diameter of less than 0.08 inch. The off-gas leaves from the highest reaction compartment and the HOCl-solution leaves the column at the lowest reaction compartment. The chlorine gas may also be mixed with non-reactive gas or such gas may be introduced separately. In the latter case it is preferred to introduce the chlorine in the compartment above the lowest one and to feed the inert gas into the lowest compartment. In any case, the gas phase rising in the reactor consists predominantly of chlorine. With advantage one may circulate back into the column the suspension of non-reacted limestone with part of the solution of the reaction products. The residence time in the collecting space below the bottom of the lowest reaction chamber is 2 to 10 minutes. Simultaneous application of all measures described above makes it possible to increase the reaction rate and so reduce contact time together with the time the HOCl-solution has to remain in the system. The last feature is the main reason for a high yield of hypochlorous acid.

The invention also makes it possible to carry out a variety of other technological processes with improved yields. An example of such a process is the absorption of sulphur dioxide in aqueous suspensions of alkaline earth metal hydroxides or -carbonates with the formation of hydrosulphites according to the equations:

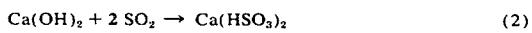

$$Ca(OH)_2 + 2 SO_2 \rightarrow Ca(HSO_3)_2 \qquad (2)$$

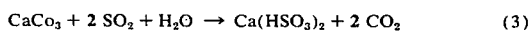

$$CaCo_3 + 2 SO_2 + H_2O \rightarrow Ca(HSO_3)_2 + 2 CO_2 \qquad (3)$$

The method and installation can also be used to remove harmful constituents from air or gases and one can, if desired, combine the installation with equipment for regenerating the absorption agent or agents. One may, for example, remove gaseous hydrogen sulphide from air or from refinery or coke oven gases by reacting them with solutions containing solid compounds such as calcium carbonate, iron hydroxide, manganous oxide or zinc carbonate. In the following examples some ways of applying the method and apparatus according to the invention are given.

EXAMPLE 1

The reactor comprised 12 non-insulated glass cylinders having an internal diameter of 105 mm (4⅛inches) and 300 mm (12 inches) high. They were separated by horizontal shelf walls of pvc(polyvinyl chloride). Under the last separating shelf was a chamber of 1000 mm ((39.4 inches) height (compare FIG. 1). Each separating wall was provided with 29 circular openings of 2 L mm (0.078 inch) diameter, so that the total area of free opening amounted to 91 mm² (0.14 sq inch) and to 1.05% of the total shelf surface. Each separator carried an overflow pipe having an external diameter of 30 mm (1.2 inches) and internal diameter of 25 mm (1 inch). Length of the pipe above the shelf surface was 150 mm (6 inches) and the distance between the lower edge of the pipe and the next lower shelf was 5 mm (0.2 inch). The diameter of the circular part of the shelf under the downcoming overflow of the next higher chamber was 50 mm.(2 inches).

Through the gas inlet 7 of the lowest chamber 13 3.58 kg gaseous chlorine was introduced per hour, purity 99.9%; temperature was 20° C. Through the funnel above the highest chamber 78.3 kg/h of an aqueous suspension of ground technical limestone was injected, containing 34 g of limestone per kg suspension. Composition of the limstone was 97.6% CaCO₃, 0.11% Fe, 0.02% Mn and 2.2% insolubles in 10% hydrochloric acid.

| Particle size was: | larger than 0.03 mm | 5.6 % wt. |
| --- | --- | --- |
| | 0.02 – 0.03 mm | 10.2 % wt. |
| | 0.01 – 0.02 mm | 19.9 % wt. |
| | less than 0.01 mm | 64.3 % wt. |

Linear speed of chlorine gas in the openings of the lowest separating wall was 3.6 m (144 inches)/sec, speed of off-gas in the openings of the highest separating wall 2.1 m(84 inches)sec. Time period of reacting suspension per chamber was at 25% relative blowing volume, in total 13.2 minutes, of which 0.7 minutes in the separate reaction chambers and 3.4 minutes was in the lowest reactor space. (Relative blowing volume is 100 times the ratio of the volume of gas bubbles to the volume of the layer being blown.)

Temperature in the highest reaction chamber was 20° C. and in the lowest space under the lowest shelf 22° C. After sludge separation 80.3 kg/h of HOCl-solution was obtained with pH 4.1 to 4.2 and containing 30 g HOCl per kg solution. The solution contained 3.27 g dissolved chlorine, 0.34 g chlorine as chlorate, 20.32 g chlorine as chloride and 20.215 g chlorine in the form of HOCl per kg solution.

From the highest reactionchamber 685 l off-gas of 20° C. was let out per hour, containing 0.05 g chlorine/l. The result of calculation was that per unit of chlorine input losses were 0.97% in the off-gas, 7.34% dissolved in the solution, 0.76% was converted into chlorate, 45.58% into chloride and 45.35% into HOCl. Theoretically the maximum yield of HOCl based on chlorine amounts to 50%, so that the efficiency was 90.7% of theory. Sludge was 0.46 kg/hr.

EXAMPLE 2

The reactor according to FIG. 1 consisted of 20 reaction chambers one above the other. Further parameters of the installation were the same as in example 1. Per hour a mixture of 3 kg chlorine and 0.206 kg nitrogen was introduced into the bottom space of the reactor. Temperature of gas mixture 12° C. Through the funnel into the highest chamber a suspension of ground limestone was injected containing 32.8 g limestone/kg of suspension. Injection was continuously in a quantity of 80.4 kg of suspension/h. Temperature of suspension 12° C., composition and particle size as in example 1. Reaction temperature in highest compartment 12° C. and in the lowest one 14° C. Gas speed (linear) in lowest shelf 3.5m(140 inches)/sec., in the highest 2.04 m (81.6 inches)/sec. Total residence time 18 minutes of which 0.7 minutes per reaction chamber and 3.3 minutes in the lowest space. After sludge separation 81.7 kg solution was obtained containing 25 g HOCL per kg of solution. The solution contained per kg of 1.84 g dissolved chlorine, 0.137 g chlorine as chlorate, 17.7 g as chloride and 16.9 g as HOCl. The pH was 4.5; off-gas 667l/h containing 0.018 g chlorine per liter. Sludge 0.58 kg/h.

Calculated chlorine balance: losses in off-gas 0.4%, as dissolved chlorine 5%, as chlorate 0.4% and as chloride 48.3%, whereas 46.0% was converted into HOCl, giving a final yield of 92% of theory.

We claim:

1. A method of reacting a gas with at least one of the phases of a mixture of solids and liquid, which comprises feeding a fluid suspension of the solids in the liquid continuously into the highest reaction zone of a series of reaction zones disposed vertically one above another, in each of said zones maintaining a layer of suspension at a predetermined depth and as the volume of suspension therein exceeds said depth overflowing the excess suspension in a stream thereof conducted into the layer of suspension in the next lower reaction zone and, in the case of the lowest of said zones, conducted into a collecting space below it, the respective overflow streams from successive reaction zones being spaced horizontally away from each other, flowing gas continuously upwardly through the respective layers of suspension in said zones in succession and subdividing the gas flow entering each of said layers into a multiplicity of gas streams having a velocity sufficient for turbulently agitating the suspension in the layer, the gas upflow through at least a plurality of said layers containing the reactant gas, and continuously taking off residual gas from said highest reaction zone, each of said overflow streams being conducted from the surface of the layer of suspension in one reaction zone into a bottom region of the layer of suspension in the next lower reaction zone at a location in the latter layer spaced horizontally away from the locations of entry of said gas streams thereinto, said suspension being an aqueous suspension of finely divided limestone and said gas consisting predominantly of chlorine, whereby a reacted suspension containing hypochlorous acid in aqueous solution is obtained in said collecting space.

2. A method of reacting a gas with at least one of the phases of a mixture of solids and liquid, which comprises feeding a fluid suspension of the solids in the liquid continuously into the highest reaction zone of a series of reaction zones disposed vertically one above another, in each of said zones maintaining a layer of suspension at a predetermined depth and as the volume of suspension therein exceeds said depth overflowing the excess suspension in a stream thereof conducted into the layer of suspension in the next lower reaction zone and, in the case of the lowest of said zones, conducted into a collecting space below it, the respective overflow streams from successive reaction zones being spaced horizontally away from each other, flowing gas continuously upwardly through the respective layers of suspension in said zones in succession and subdividing the gas flow entering each of said layers into a multiplicity of gas streams having a velocity sufficient for turbulently agitating the suspension in the layer, the gas upflow through at least a plurality of said layers containing the reactant gas, and continuously taking off residual gas from said highest reaction zone, each of said overflow streams being conducted from the surface of the layer of suspension in one reaction zone into a bottom region of the layer of suspension in the next lower reaction zone at a location in the latter layer spaced horizontally away from the locations of entry of said gas streams thereinto, said suspension being an aqueous suspension of ground limestone particles predominantly smaller than 0.08 inch in diameter, containing 15 to 35 grams of $CaCO_3$ per kg of the suspension and having a temperature of 10° to 30° C., said gas consisting predominantly of chlorine, and the rate of feeding of said suspension being such that the resistance time of the suspension in each of said layers averages 0.5 to 2 minutes, whereby a reacted suspension containing more than 2% by weight of hypochlorous acid in aqueous solution is obtained in said collecting space.

3. A method according to claim 2, said gas being introduced into said collecting space and the suspension overflowing into said space being maintained therein for an average residence time of 2 to 10 minutes.

4. A method according to claim 1, said location of entry of each said overflow stream being spaced directly above a portion of the bottom of said next lower reaction zone which is free of passageways for gas streams and the diameter of which is greater than that of the overflow stream by 2 to 4 times the distance between said location and said bottom portion.

5. A method according to claim 4, said distance amounting to about one sixth to one fourth of the diameter of the overflow stream at said location.

* * * * *